April 16, 1946.   J. J. SCHANTZ   2,398,451
DRESSING DEVICE FOR GRINDING WHEELS
Filed March 4, 1941   7 Sheets-Sheet 1

INVENTOR
John J. Schantz
By Parker, Carlson, Pitzner & Hubbard
ATTORNEYS

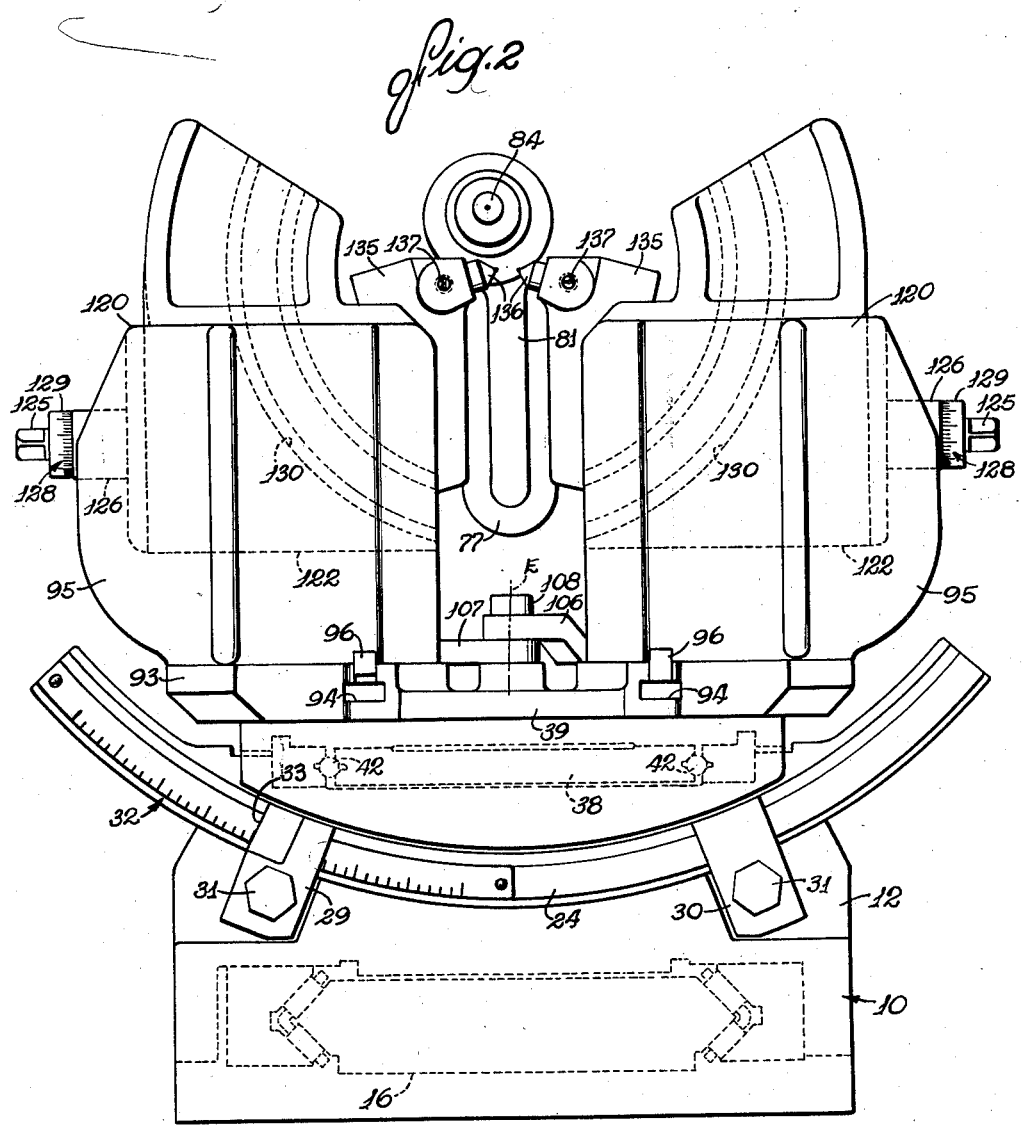

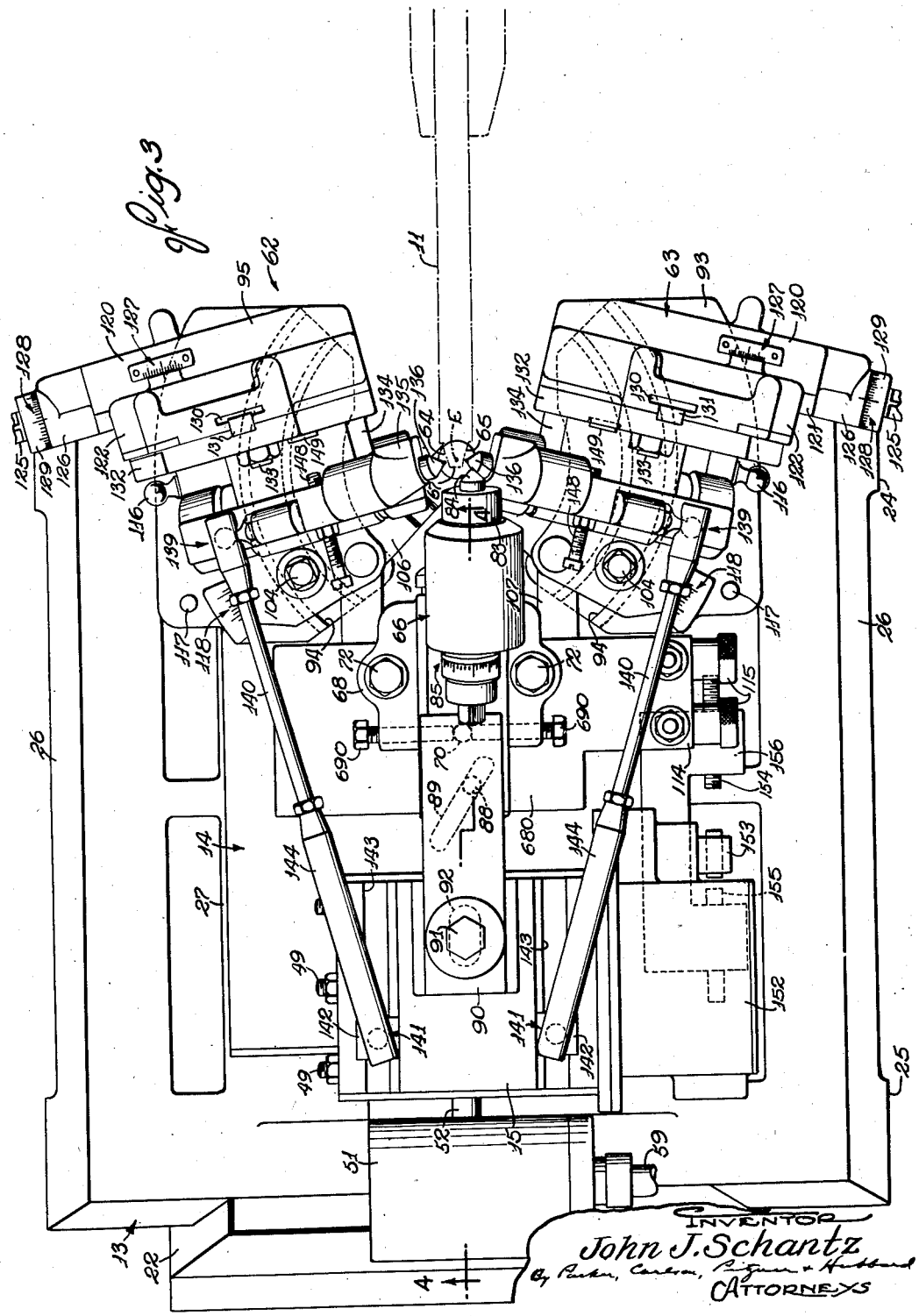

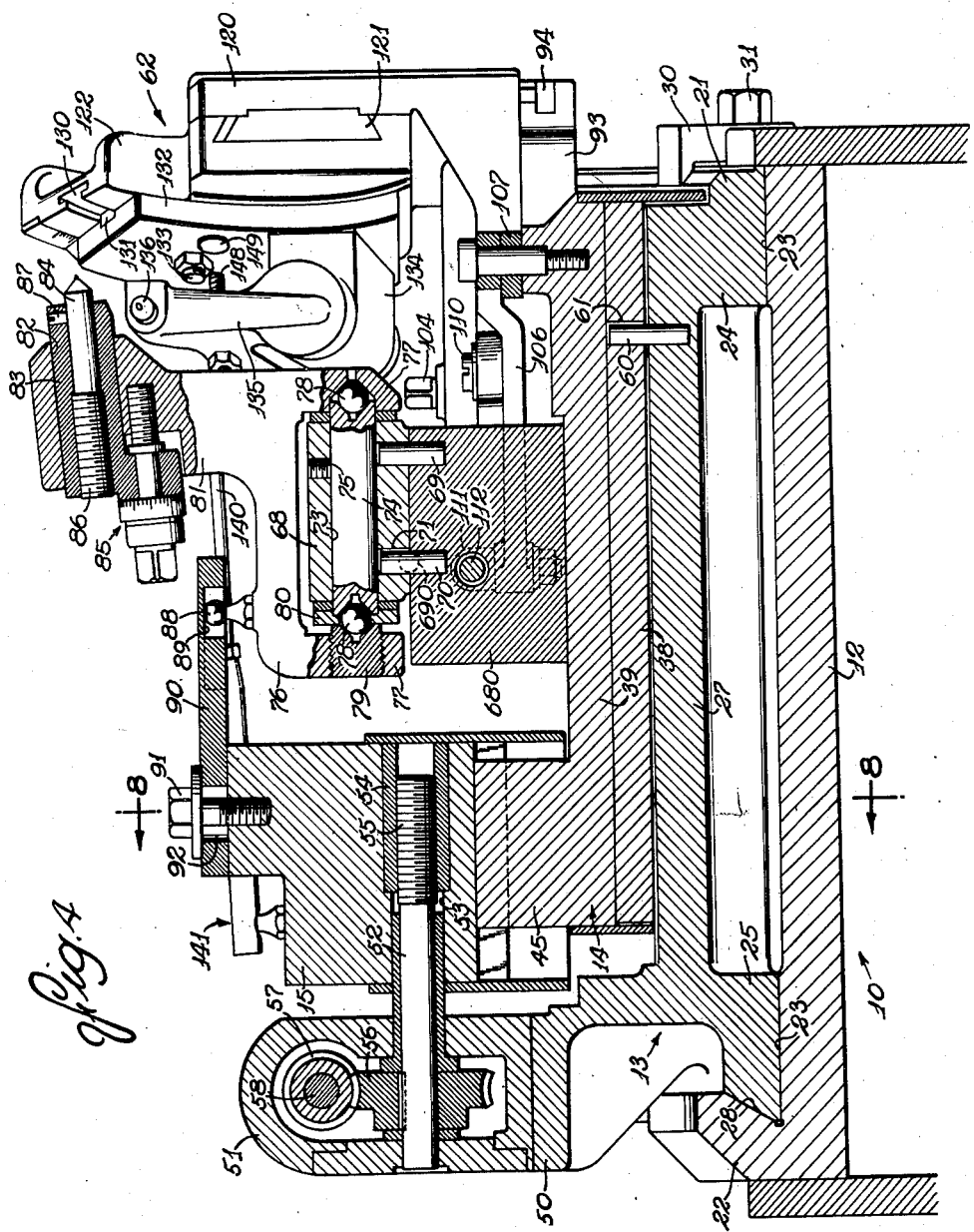

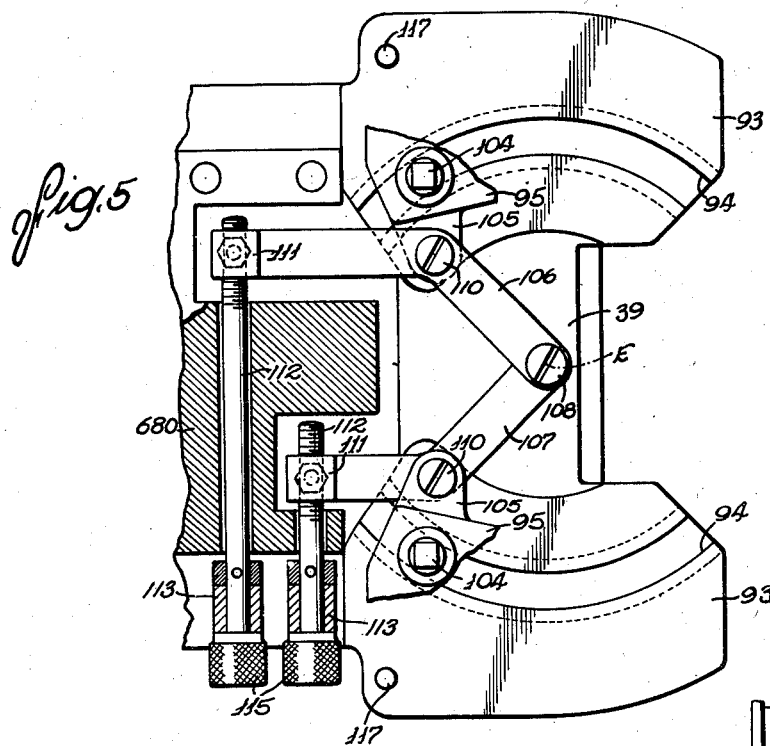

April 16, 1946. J. J. SCHANTZ 2,398,451
DRESSING DEVICE FOR GRINDING WHEELS
Filed March 4, 1941 7 Sheets-Sheet 6

INVENTOR
John J. Schantz
By Parker, Carlson, Pigure + Hubbard
ATTORNEYS

April 16, 1946.        J. J. SCHANTZ        2,398,451
DRESSING DEVICE FOR GRINDING WHEELS
Filed March 4, 1941        7 Sheets-Sheet 7
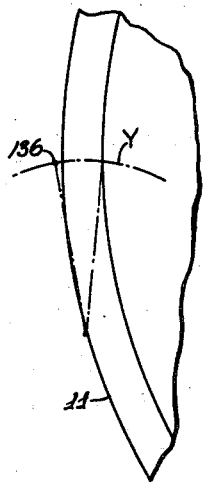
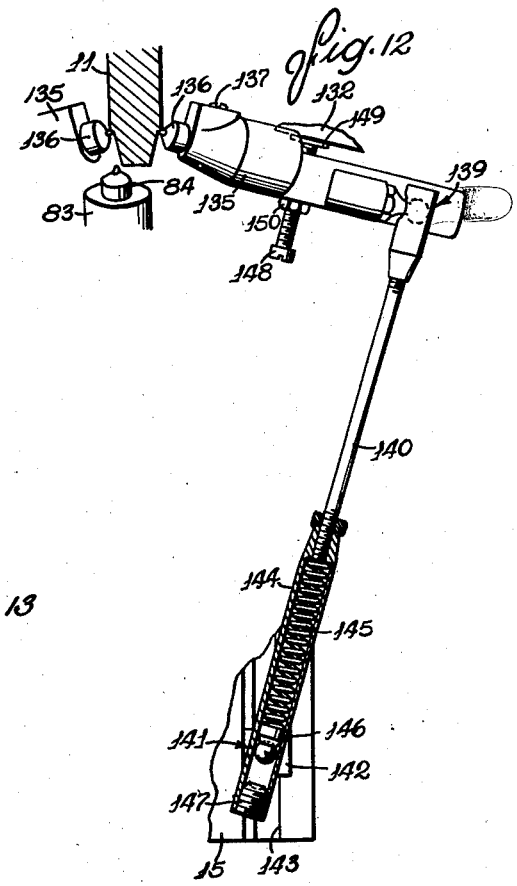
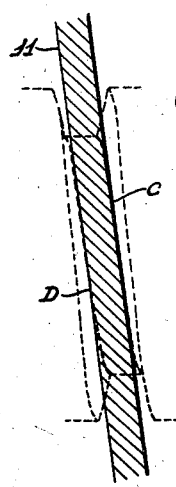
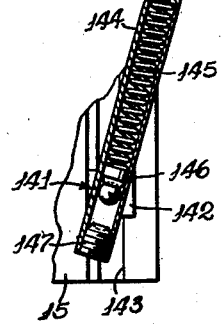
INVENTOR
John J. Schantz
ATTORNEYS Patented Apr. 16, 1946

2,398,451

UNITED STATES PATENT OFFICE 2,398,451

DRESSING DEVICE FOR GRINDING WHEELS

John J. Schantz, Detroit, Mich., assignor to Ex-Cell-O Corporation, Detroit, Mich., a corporation of Michigan Application March 4, 1941, Serial No. 381,678

3 Claims. (Cl. 125—11)

The invention relates to dressing devices for grinding wheels and more particularly to devices of this nature capable of dressing active surfaces of a wheel intended especially for the generation, correction or finishing of precision worms or worm wheel cutting hobs with extreme accuracy.

Such machine tool mechanisms as dividing heads and hobbing machines frequently employ worm and worm wheel gearing in which the highest degree of accuracy of tooth form is required for proper operation without excessive drag or friction, lost motion or variation through successive units of angular distance. In worm and worm wheel gearing of this nature the worm is usually a helicoid of the involute system, the cross sectional form of which, when seen on an axial plane, should comprise a series of straight sided rack teeth. The teeth of the worm wheel which operatively engages such a worm should have on the same plane the cross sectional form of an involute of like pitch and pressure angle.

The relationship above expressed is the theoretically correct one which heretofore could not be obtained in production. The diameter of a grinding wheel must be of such size that the life of a dressed form on the wheel will be comparatively great. Yet with a grinding wheel of such diameter it has heretofore been impossible to reproduce in the worm the complement of the cutting surfaces of the wheel because of wheel interference. This action is the result of the engagement of the flat-plane grinding wheel in a helically extending groove. Thus, the wheel will develop on the worm blank the complement of its cutting surfaces on a plane which is axial of the wheel and perpendicular to the helix angle of the groove and includes a line between the axes of the wheel and blank. However, on the opposite sides of such plane, the wheel will unavoidably engage and cut into the side surfaces defining the groove to destroy the complementary shape developed as above described by the grinding wheel. Consequently, while the active surfaces of the grinding wheel could be dressed to the complement of a straight sided worm, it has been impossible to produce such a worm form with precision by a wheel so dressed.

A general object of the invention is to provide new and improved means for dressing a grinding wheel for developing or producing with extreme precision a straight sided surface on a helical worm or the like, or a surface on a worm wheel cutting hob which will produce on a worm wheel blank an accurate tooth form for precision engagement with such a worm.

Another object is to provide a new and improved grinding wheel dressing device which embodies means for adjusting each tool for dressing a flank surface of the wheel to a contour or profile modified from that which would produce a straight sided complemental surface by the extent of the material removed as a result of wheel interference.

More specifically stated, an object of the invention is to provide a new and improved dressing device of this character which embodies pivotally mounted dressing tools for the flank surfaces of the grinding wheel and means for adjusting the pivotal axes thereof to positions in which the planes in which the tools move are angularly related to planes tangential to the wheel flank surfaces substantially at the lines of tool movement across the wheel flanks to develop an arcuate contour which will compensate for wheel interference.

Another object is to provide new and improved means in a dressing device of this nature for limiting the extent of movement of the wheel flank dressing tools in one direction.

Other objects and advantages will become apparent in the following description and from the accompanying drawings in which:

Fig. 2 is a front view of the device as seen from the position of the grinding wheel.

Fig. 3 is a plan view of the device, parts of the supporting structure being omitted for clarity.

Fig. 4 is a longitudinal sectional view on a vertical plane taken substantially along the line 4—4 of Fig. 3.

Fig. 5 illustrates in plan view a detail of the means for adjusting the flank dressing tools to the angle of the wheel flank.

Fig. 6 is an elevational view looking toward the rear face of one of the flank dressing tool assemblies (herein the right hand assembly as seen in Fig. 3).

Fig. 7 is a vertical sectional view through such assembly taken along the line 7—7 of Fig. 6.

Fig. 11 is a diagrammatic view showing the relationship of the flank dressing tool to the grinding wheel.

Fig. 12 is a view partially in section of a detail of the driving means for a flank dressing tool.

Fig. 13 is a diagrammatic view illustrating the operative relation of the grinding wheel and worm.

Fig. 14 shows on an exaggerated scale the cross sectional contour of a grinding wheel dressed to a modified form in accordance with the present invention.

Figure 1:
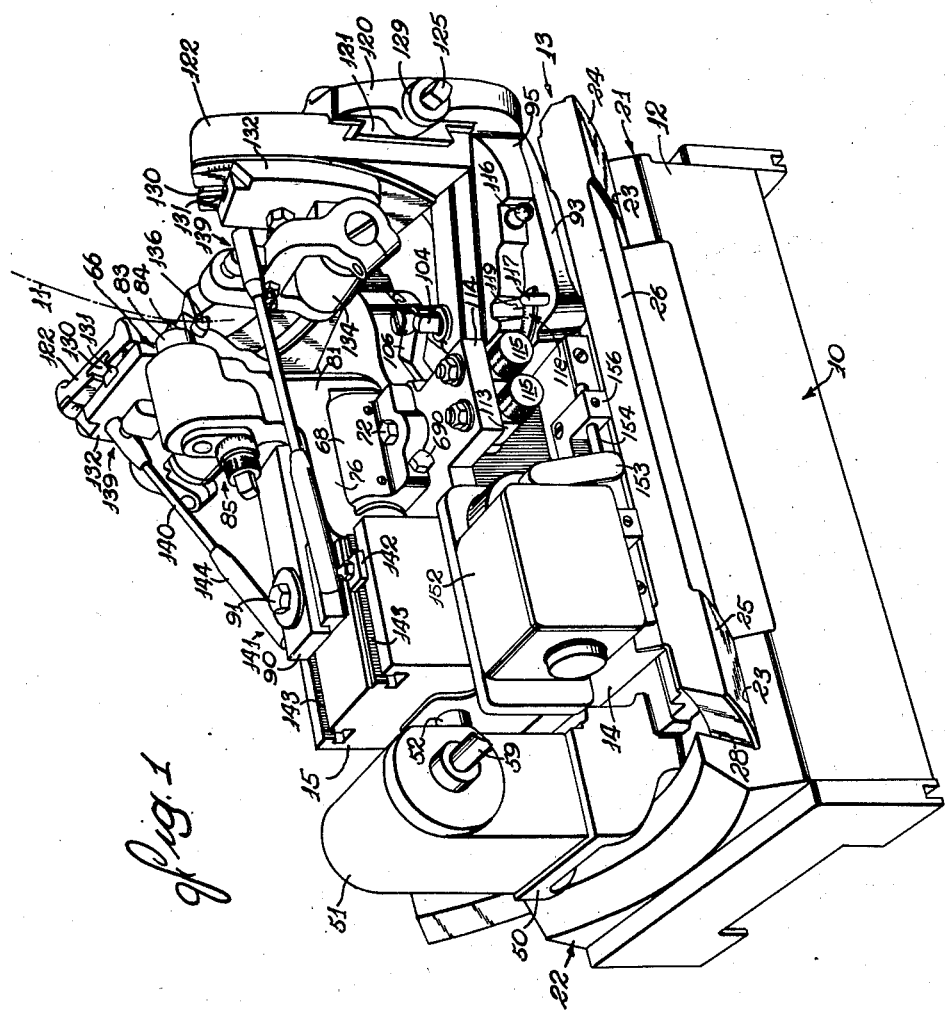
Figure 1 is a perspective view of a dressing device embodying the features of the invention.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

It may be mentioned at the outset that the present invention is concerned with precision work in which an extremely high degree of accuracy on the finished work is required. The factors that will be hereinafter discussed as introducing error do not produce inaccuracies which are considered material in ordinary finishes. These factors have, however, precluded attainment of extreme accuracy and it is this highest degree of precision that is reached by the present invention.

Figure 9:
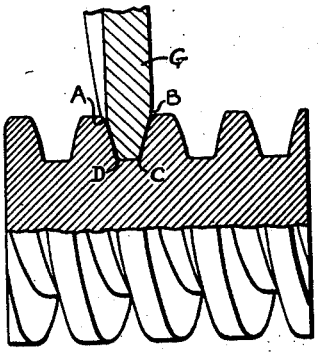
Fig. 9 is a diagrammatic view showing in greatly exaggerated form a grinding wheel dressed to a form complementary to a straight sided worm and the distorted worm form produced as a result of wheel interference.

Wheel interference is caused by a number of factors which include the pressure angle of the involute system, the lead or helix angle of the worm (herein considered only with reference to the angle at the pitch line), the root to outside diameter dimension of the worm and the ratio of the worm and grinding wheel diameters. The extent of wheel interference will vary with a change of any one of these factors. Thus wheel interference increases as the pressure angle decreases; as the lead angle increases; as the root to outside diameter dimension of the worm increases and as the ratio between the worm and wheel diameters increases. Referring to Fig. 9 of the drawings the letter G indicates a grinding wheel having an active surface dressed by conventional methods to produce a worm having straight sides or flanks. The sectioned portion of the figure is taken on a plane that passes through the axis of the worm and includes a line joining the wheel and worm axes on the rotational plane of the wheel. This plane is the one on which the worm should comprise a series of straight side rack teeth and does not coincide with the plane on which the wheel develops its profile, the latter plane being one through the axis of the grinding wheel and including said line. Where the several factors are such as to produce wheel interference, the outer corner portion A (Fig. 9) and the inner diagonally opposed portion C of the worm will be cut on one side of the plane shown in Fig. 9 and the outer corner portion B and the inner portion D diagonally opposed thereto will be cut on the opposite side of the plane while the wheel accurately projects its profile only along the pitch line of the worm. For convenience it will be considered that the plane is a horizontal one and that the wheel portions A, C and B, D respectively, cut the worm above and below the plane. Thus, as a result of wheel interference the worm profile will not be a projection of the cross sectional contour of the wheel but will be a distortion thereof having somewhat the form of the convex surfaces A—D and B—C.

Figure 10:
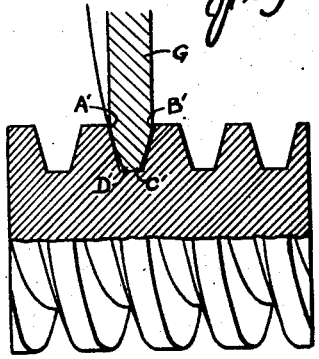
Fig. 10 is a similar view showing a grinding wheel having a modified form according to the present invention and the straight sided worm produced thereby.

According to the present invention this distortion of the form of a straight sided worm is overcome by providing active surfaces on the grinding wheel that are modifications of the straight sided wheel flanks shown in Fig. 9 to compensate for the removal of material by wheel interference. While in the modified form, as shown in Fig. 10, the thickness of the wheel at the pitch line remains unchanged (since wheel interference does not distort the cut made by the grinding wheel at the pitch line) the contour of wheel flanks A'—D' and B'—C' in a radial plane is arcuate. The arc is so generated as to relieve or cut away the opposed interfering portions of the wheel to such an extent that the action of the wheel throughout the areas where interference occurs cuts the worm to the precise plane of the desired straight side. Because wheel interference increases gradually on either side of the pitch line, the compensating departure from the straight sided wheel flank takes the form of an arc which is the resultant of the several variable factors involved. The exact arc to be used under given conditions may be mathematically computed but it is considerably more simple, using the mechanism hereinafter described, to arrive at the proper arc form by trial.

Dressing devices embodying the features of the invention are adapted for association with various types of grinding machines such for example as that shown and described in the copending application of Max A. Mathys Serial No. 350,348 filed August 3, 1940. The machine disclosed in said application is adapted for worm grinding operations and in the present application the dressing device has been illustrated and will be described as being arranged to dress a grinding wheel in accordance with the present invention to a peripheral contour for grinding a worm having accurate straight sides.

The exemplary device, as may be seen from Fig. 1, embodies an arrangement of several superimposed supporting means and slides including a dresser slide 10 for supporting the entire dressing device in operative relation to the grinding wheel 11, a dresser base 12 on which is mounted a cradle member or support 13 for adjusting the dressing device to the helix angle setting of the grinding wheel, an approach slide 14 arranged for reciprocatory movement to carry the dressing tools into and away from an operative relation to the grinding wheel, and an actuating slide 15 movable to traverse the dressing tools carried by the approach slide across the grinding wheel surface to be dressed.

Figure 8:
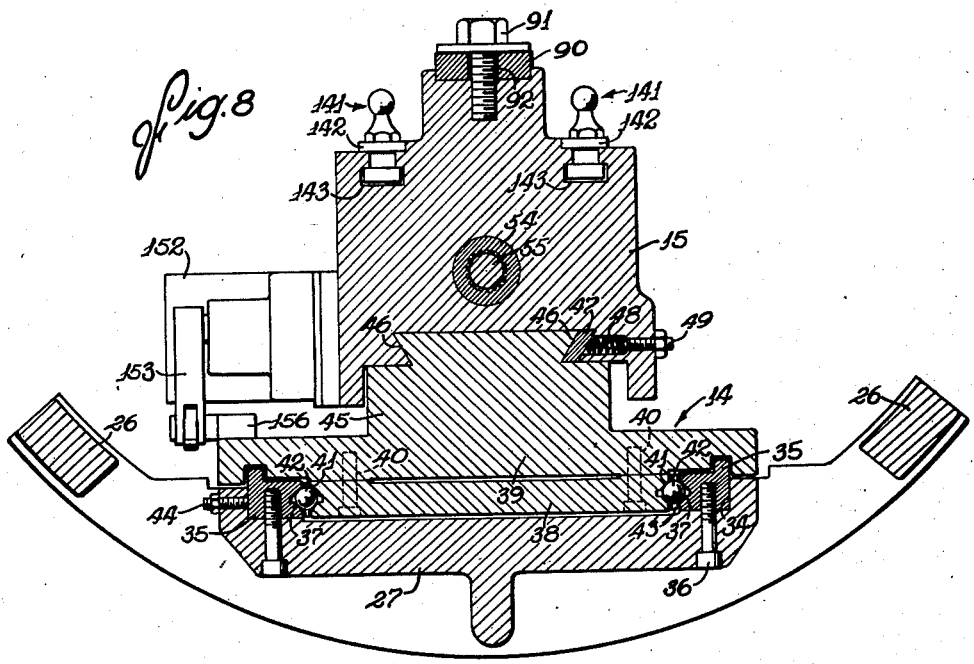
Fig. 8 is a transverse sectional view on a vertical plane taken substantially on the line 8—8 of Fig. 4.

Referring more specifically to the structural relationships, the dresser slide is supported in any suitable manner for set-up adjustments as by a grinding wheel slide 16 (Fig. 2) forming a part of the machine structure of the Mathys application above identified. At the front and rear ends 21, 22 of the dresser base upwardly facing concave ways 23 are provided to support the cradle member 13. This member is a frame having arcuate front and rear guides 24, 25 complemental to the ways 23 connected by side and intermediate cross bars 26, 27 (Fig. 8). The rear guide 25, and its associated way 23, preferably have an undercut interfitting relation, indicated at 28, defining the rearward position of the cradle. The position of angular adjustment of the cradle to the dresser base may be suitably fixed by such means as clamping members 29, 30 (Fig. 2) secured as by bolts 31 to the front of the dresser base 12 for binding engagement with the front face of the front guide 24. By this adjustment the operator sets the dressing device according to the helix angle setting of the grinding wheel and the angularity of the adjustment may be suitably indicated by a scale 32 on the front face of guide 24, the edge 33 of the clamp 29 serving as an indicator.

The intermediate cross bar 27 is, as may be seen in Fig. 8, of substantial width and has a wide longitudinally extending recess 34 therein. At each side of the recess a rail 35 is secured as by screws 36 and the inner face of each rail has a longitudinally extending groove 37. The approach slide 14 is mounted above the intermediate cross bar 27 and includes, for convenience of manufacture and assembly, lower and upper sections 38, 39, respectively, secured together as by screws 40. The lower section 38 extends between the rails 35 and the side faces thereof have longitudinally extending grooves 41 opposing the grooves 37 in the rails. Each pair of grooves 37, 41 constitute raceways for a series of anti-friction roller elements 42 held in place by a spacer or retainer plate 43 to complete the bearing relationship. One of the rails, for example, the left hand rail 35, may be laterally moved, as by set screws 44, to adjust the relation of the rails, approach slide and bearings to an operating condition in which the frictional resistance to movement of the approach slide relative to the cross bar 27 is at an approximate minimum.

At its rear end the upper section 39 of the approach slide has an upstanding part 45 (Figs. 4 and 8) provided on its upper surface with longitudinally extending undercut or dovetail ways 46 to receive the actuating slide 15. One way engaging surface on the actuating slide is defined by a bar 47 in the nature of a gib which is resiliently urged toward the associated ways 46 by such means as springs 48 backed by tension adjusting screws 49. The purpose of this arrangement is to enable the frictional resistance to movement of the actuating slide 15 relative to the approach slide 14 to be adjusted to a point where it is substantially greater than the minimum frictional resistance between the approach slide and the intermediate cross bar 27.

At the rear end of the approach slide is an upstanding bracket 50 supporting a housing 51 for the driving mechanism. This mechanism includes a shaft 52 rotatably mounted in the housing 51 to extend into a longitudinal bore 53 located centrally of the actuating slide 15. Rigidly seated in the front end of the bore 53 is a tubular nut 54 engaged by a feed screw 55 on the end of the shaft 52. Within the housing 51 the shaft 52 has a worm wheel 56 secured thereto and engaged by a worm 57 on a drive shaft 58 suitably journaled in the housing. In the present instance power is delivered to the drive shaft 58 from a motor (not shown) through a flexible drive cable indicated at 59 in Figs. 1 and 3. A reversible motor is employed for driving the actuating slide in opposite directions.

Through the relationship of the frictional resistances to movement of the approach and actuating slides, the cycle of operating movements may be obtained in a simple manner by the single feed screw 55. Thus, the initial movement resulting from actuation of the feed screw is a conjoint travel of the approach and actuating slides as a unit since the substantially heavy friction between the actuating slide and the approach slide prevents relative movement of these parts as long as the approach slide is free to move. The permissible movement of the approach slide is relatively short and may be limited in any suitable manner as by pin 60 (Fig. 4) on the intermediate cross bar 27 engaging a somewhat elongated aperture 61 in the lower section 38 of the approach slide.

As soon as the approach slide is moved in either direction to a limit of its movement, continued rotation of the feed screw 55 will move the actuating slide relative to the approach slide. Hence, considering that the slides are in their retracted or rearward positions, initial rotation of the feed screw 55 will first move the approach slide to its forward limit as shown in Fig. 4, and thereafter continue the forward movement of the actuating slide. Reverse rotation of the feed screw will first move the approach and actuating slides rearwardly to the limit of movement of the approach slide, and thereafter continue the rearward movement of the actuating slide. These movements, in the order in which they occur, are utilized first to shift the dressing tools into an operative relation with respect to the grinding wheel, then to effect a dressing movement of the dressing tools across the surfaces to be dressed, then to retract the tools from the grinding wheel and finally to return the dressing tools to their initial position.

In the present embodiment, three dressing tools and individually adjustable supporting assemblies therefor are provided comprising, as may be seen in Fig. 3, two opposed assemblies 62, 63 for dressing the opposite side faces or flanks 64, 65 of a peripheral portion of the grinding wheel 11 and an intermediate assembly 66 for dressing the peripheral face or edge 67 of the wheel. Each dressing tool assembly includes means for pivotally supporting the tool for swinging movement relative to the surface of the wheel to be dressed by that tool.

Referring first to the structure of the intermediate dressing tool assembly 66, a pivot block 68, Figs. 3 and 4, is mounted on a supporting member 680 which in turn is secured to the upper section 39 of the approach slide. The pivot block 68 is adjustable about a pin 69 on the supporting member 680 to enable proper setting up of the intermediate dressing tool relative to the end face 67 of the grinding wheel. The position of the block 68 may be determined and fixed in any suitable way as by opposed set screws 690 on the block for engagement with a pin 70 extending from the supporting member 680 into a transversely extending slot 71 on the block. Clamping screws 72 or the like rigidly secure the block to the supporting member in any position of adjustment. The block has a longitudinally extending bore 73 (Fig. 4) supporting a pivot member 74 in a position fixed by a set screw 75.

A supporting member 76 (Fig. 4) for the dressing tool is in the nature of a swinging bracket having a bifurcated lower end portion providing spaced arms 77 dimensioned to straddle the opposite ends of the pivot member 74. Pivot bearings 78 such as anti-friction balls, are seated in opposed recesses provided in the end faces of the pivot member 74, in one of the arms 77 and in a plug 79 carried by the other arm. Spacers 80, or the like, may be interposed between the pivot member 74 and the arms 77 to protect the pivot bearings. The supporting member near its front end has an upstanding part 81 having a bore 82 in its upper end to receive a supporting sleeve 83 in which a dressing tool 84 or diamond holder is mounted. The axial position of adjustment of the sleeve 83 (and consequently of the tool or diamond) may be suitably determined by a micrometer device 85, the position being fixed by such means as a back-up screw 86 and a set screw 87.

Toward its rear side, the supporting member 76 carries a rounded head 88 for engagement within a slot 89 formed in a driving cam 90. The slot, as shown in Fig. 3, is at an angle to the pivotal axis about which the supporting member 76 swings, so that longitudinal movement of the cam will swing the supporting member transversely. The driving cam extends over and is secured to the upper surface of the actuating slide 15 by such means as a clamping screw 91 extending through a longitudinally elongated slot 92 to engage the actuating slide. This arrangement enables adjustment of the driving cam relative to the head 88 engaged thereby, to determine the initial or starting position of the intermediate dressing tool.

The oppositely disposed dressing tool assemblies 62, 63 are substantially alike and it will, therefore, be necessary to describe the structure of but one assembly. Thus, referring to Figs. 1, 2, 3, 4, and 7, the dressing tool assembly 63 includes a supporting base 93 which may be formed as an integral upwardly and forwardly projecting part of the upper section 39 of the approach slide. The upper surface of the base 93 is arcuately traversed in a front to rear direction by a T-slot 94, the slots on both bases being formed on radii of equal lengths about a common center point E located within and in close proximity to the perimeter of the grinding wheel and substantially on the center plane thereof. Supporting means for the dressing tool assembly in the form of a bracket block 95 is mounted on the base 93 for adjustment along the slot 94, the relative position being accurately maintained by such means as spaced keys 96 (Fig. 7) on the bracket block engaging the slot. Suitable means for securing the bracket block in any adjusted position comprises in the present instance a clamping pin 97 mounted loosely on the bracket block and having a head 98 engaging the slot 94. The shank of the clamping pin has a cam notch 99 therein engageable by a cam nose 100 on one end of a slidable rod 101. The other end of the rod is angular and is engaged, as at 102, by the complementally shaped end of a second rod 103. A clamping screw 104 is arranged to bear against and act through the second rod 103 to move the first rod 101 endwise and force the head 98 on the pin 97 into clamping engagement with the base 93.

Convenient means is provided for adjustably shifting the positions of the oppositely opposed dressing tool assemblies 62, 63 along the slots 94. Thus, as may best be seen in Fig. 5 each bracket block 95 has an ear 105 projecting inwardly from its rear inner margin. Adjusting levers 106, 107 each have one end secured by a common pivot 108 to the upper section 39 of the approach slide substantially on the common center E. The levers 106, 107 extend rearwardly from the common pivot and between their ends are offset outwardly to pass across the ears 105 on the bracket blocks. Pivots 110 join the levers and ears. The lever 106 is slightly longer than the lever 107 and a nut 111 is articulated to the rear end of each lever for engagement with an adjusting screw 112. The supporting member 680 is recessed at its front side to receive the rearwardly extending ends of the levers 106, 107 and is transversely bored to accommodate the adjusting screws 112. These screws extend to the same side of the supporting member 680 (herein the left hand side looking rearwardly from the front of the device) and are pivotally supported by bearings 113 secured to the under side of an overhanging ledge 114 (Fig. 1) on the supporting member 680. Both adjusting screws terminate in finger pieces 115. Accuracy of adjustment may be conveniently obtained by providing spaced members such as pins 116, 117 (Fig. 3) on the bracket block 95 and supporting base 93, respectively, for engagement with a suitable gauge block (not shown) positioned therebetween. The relative positions of adjustment of the opposite assemblies may be suitably indicated as by scales 118 (Figs. 1 and 3) on the supporting bases 93 and cooperating pointers 119 on the bracket blocks 95.

Each bracket block 95 is an L-shaped structure which includes, in addition to the base part that slidably engages the supporting base 93, an upstanding part 120 (see Fig. 7) on which the dressing tools are adjustably mounted. Thus, on the rear face of each upstanding part 120 are horizontal transversely extending ways 121 for slidably supporting a carriage 122. Adjustment of the carriage along the ways may be effected by such means as a nut 123 located between the ways 121 and secured to the carriage 122 by screws 124 for engagement by an adjusting screw 125 journaled in a bearing 126 (Fig. 6). The adjusted position of the carriage may be determined by an indicating scale 127 (Fig. 3) on the upstanding part 120 for directly indicating the position of the carriage and by a rotating scale 128 (Fig. 6) on a head 129 of the feed screw 125 for indicating the rotary position of the feed screw.

The rear face of each carriage is traversed in a generally vertical direction by an arcuate guide groove 130 (Figs. 6 and 7) for engagement by spaced keys 131 secured to the upper and lower ends of a dressing tool slide 132. The guide groove 130 is T-shaped in cross section and a headed bolt 133 (Fig. 7) on the slide 132 engages the groove to clamp the slide in any desired position of adjustment. In the present instance the guide grooves 130 in the opposite assemblies are formed about a common center, which is approximately on the diameter of the grinding wheel that intersects the axis of the workpiece.

Projecting rearwardly and horizontally from each dresser slide is a lug 134 that terminates in a head which corresponds substantially to the pivot block 68 of the intermediate dressing tool assembly. The lug 134 houses a pivot assembly which, since it is substantially the same as that described in connection with the intermediate dressing tool assembly is not particularly illustrated. The axis of the pivotal structure housed in each of the lugs 134 is disposed substantially to intersect the vertical center E. A supporting member 135 for a dressing tool 136 is swingably mounted on the pivot assembly in the lug 134 and the supporting member is substantially like the previously described supporting member 76. The dressing tool 136, however, is seated in a receiving bore in the supporting member 135 and is there held by such means as a set screw 137

(Fig. 2). The dressing tools, herein shown as diamonds, are arranged at an angle toward the periphery of the grinding wheel. Therefore, by rotating the tool after it has become worn, and securing it in a new position, a sharp corner or edge may again be presented to the wheel.

In grinding worms it may be desirable to "break" or develop a small radius on the outer diameter margin of the worm. The grinding wheel may be dressed by the present device to accomplish this result. Thus, the end of the working stroke of each flank dressing tool 136 may be adjustably limited as by means of a screw 148 (Fig. 3) disposed on the swinging support 135 for adjustable engagement with a stop 149 mounted on the dressing tool slide 132. A lock nut 150 maintains the adjustment of the screw 148 relative to the swinging support. Since the flank dressing tools dress the grinding wheel during movement thereof radially inwardly from the periphery of the wheel, the screw 148 may be adjusted to limit the extent of the working stroke to a distance less than that required to translate the dressing tool beyond the adjacent side face of the grinding wheel. When thus limited the dressing point or diamond will, at the time of its dressing stroke, develop a slight radius as indicated at 151 (Fig. 14) along the inner edge of the wheel flank, which radius will, in the operation of the grinding wheel, cut away or break the margin of the worm along its outer diameter.

On the upper surface of the support 135 is a rounded head 138 forming part of a ball and socket joint 139 (Figs. 3 and 12) by which the swinging support 135 is connected with an actuating rod 140. The actuating rod extends rearwardly to a position above the actuating slide 15 and at its rear end has a ball and socket connection 141 with a slide nut member 142 (Fig. 8) adjustable along the length of a longitudinally extending T-slot 143 on the actuating slide. By adjusting the connections between the actuating rods 140 and the actuating slide 15 a proper driving relation between the actuating slide and both dresser tool assemblies 62, 63 may be readily obtained in all positions of adjustment of these assemblies.

Preferably the ball and socket connections 141 include lost motion to permit of overtravel of the actuating slide 15 when the swinging movement of the opposed flank dressing tools is arrested. Thus, the rear ends of each actuating rod is a tubular member 144 (Fig. 12) enclosing a spring 145 for exerting a force rearwardly against a sliding head 146 to hold it against the ball element of the connection 141. A plug 147 is located in the outer end of the tubular member for engagement by the ball element in the withdrawal movement of the actuating slide. The spring 145 has ample strength to transmit the approach movement of the actuating slide to the respective swinging supports 135 for the flank dressing tools 136 but will yield when the limit of travel of these supports as determined by the stop screws 148 is reached.

As may be seen in Fig. 2, the three dresser tools are so arranged that the intermediate tool 84 will not interfere with either of the flank dressing tools 136 in the swinging movement thereof. Thus, while the flank dressing tools may be arranged at substantially the same vertical level, the intermediate tool in this instance is located at a higher level. It should be mentioned that the pivotal axis about which the dressing tool 84 on the intermediate assembly swings, will normally also intersect the common center point E.

In setting up the machine for operation, the cradle is positioned according to the lead or helix angle to which the grinding wheel is set. Each of the dressing tool assemblies is individually adjusted so that each tool will describe a desired path across a surface of the grinding wheel and the several driving connections of the assemblies with the actuating slide are adjusted to locate the initial or starting position of each tool. Thus, the dressing tool on the intermediate assembly 66 is adjusted to a position in which the diamond will be located initially at one side of the end face 67 (see Fig. 3) of the wheel for swinging movement on a plane tangential to that face. The opposed assemblies 62, 63 are adjusted along the slots 94 to positions in which the pivotal axis of each assembly is on a plane that is normal to a plane tangential to the associated flank 64 or 65 of the wheel substantially at the line of movement of the dressing tool across such flank.

If the dressing device is to be adjusted to dress the grinding wheel for grinding worms or threads to a form that need not be extremely accurate, the dressing tool slides 132 are adjusted with respect to the carriages 122 so that the axes about which the finak dressing tools 136 swing are perpendicular to the aforesaid tangential plane of the associated wheel flank and the plane of tool movement and the plane tangential to the wheel flank are parallel. The dressing tool carriages 122 are adjusted inwardly toward or outwardly from the grinding wheel to effect a proper operating relation between the dressing points and the wheel flanks in which the plane of tool movement and the tangential plane coincide. In this relationship each of the flank dressing tools will traverse its wheel flank along a path that is nearly a straight line on a radial plane of the wheel. There will be a very slight inaccuracy due to the swinging movement of the dressing tool along an arcuate path Y (Fig. 11) across the circular flank of the grinding wheel. This inaccuracy is negligible, however, in ordinary finishes since its effect can be minimized by adjustment of the dressing tool carriage so that the path described by the dressing point may be caused to pass accurately through the line of the pitch diameter of the grinding wheel flank.

Where, however, extreme precision is required as in dressing the wheel to grind an accurate straight-sided surface on a worm, the flank dressing tools are adjusted to positions in which the path described by the dressing tool in its pivotal movement is determined by the various wheel interference producing relationships between the grinding wheel and the workpiece, namely, the pressure and helix angles of the worm, the dimension between the root and outside diameters of the worm and the relative diameters of the workpiece and the grinding wheel. The adjustment for causing the dressing point to swing through such a path is effected in the present machine by varying the position of the dresser slide 132 with respect to the dresser carriage 122 along the arcuate groove 130. Such adjustment shifts the axis about which the dressing tool swings and causes the dressing point in its operative movement to travel in a plane angular with respect to the tangential plane of the wheel flank. The path of the dressing point when projected on a plane radial of the wheel is an ellipse.

It may be said that the plane of movement of the dressing tool is tilted with respect to its original plane, (i. e. to the plane with which it coincides under ordinary, nonprecision conditions) so that the plane in which the dressing tool swings intersects the tangential plane at the wheel flank. The angularity of the intersection being variable according to the position of the slide 132 along the vertical guide groove 130, the dressing tool will develop a wheel flank contour on a plane radial of the wheel that is an ellipse having a curvature directly dependent on the angularity of the intersection. Whether the flank contour is concave or convex will be determined by the direction in which the angularity of the plane interesection is varied. For example, if the pivotal axis of the tool is moved downwardly with respect to its position when the dressing tool moves (as indicated in Fig. 11) on the coincidental plane tangential to the flank, then the resultant flank contour will be convex and the axis of the dressing tool may be said to be adjusted to tilt upwardly (see Fig. 6 in which the wheel is fragmentarily shown in perspective looking edgewise of the plane of the wheel flank engaged by the tool 136). This adjustment is the one that will be most frequently required and the resulting flank contour is illustrated diagrammatically in Fig. 14. If the pivotal axis of the dressing tool is adjusted in the opposite direction or tilted downwardly, then the dressing tool will swing through a path that will produce a concave flank contour. This form will not often be required.

The elliptical arc which is dressed on the flank surface of the grinding wheel will modify the straight profile of the wheel flank (that would be employed under ordinary nonprecision operations) to compensate for the amount of material that will be removed by wheel interference. In other words, the extent to which the worm would be "over-cut" by a wheel flank of straight profile under any given set of conditions can be determined and the straight profile of the wheel flank is then modified so that the material removed by wheel interference will precisely produce a straight side on the worm. In adjusting the dressing device, therefore, the carriage will be adjusted toward and away from the grinding wheel so that the dressing tool will dress the grinding wheel flank precisely to its proper form along the pitch line on the wheel. While maintaining this adjustment, the dressing tool slide is positioned to develop the required arcuate profile on the wheel flank.

It may be noted that although the pressure and helix angles and the root to outside diameter dimension of the worm will remain the same on any work blank or series of work blanks, the ratio of the diameters of the wheel or the worm will change as the active surfaces of the wheel are worn and dressed away. Consequently, from time to time the dressing devices for the flanks will require readjustment. When the flank dressing devices have been adjusted to develop a required flank surface, the actuating rods 140 are adjusted with respect to the actuating slide 15 so that the flank dressing assemblies 62, 63 will move from an initial position radially outwardly of the end face 67 of the grinding wheel inwardly across the side or flank faces 64, 65. The initial adjustments of the dressing tools are determined with respect to the advanced or forward limit of the approach slide so that in operation the diamonds will be moved by the forward travel of the approach slide into the planes to which the wheel surfaces are to be dressed. Adjustment of the stop screws 148 determine the extent of movement and may limit such movement to dress a radius 151 or to permit the dressing tool to be swung past the side face of the wheel.

In performing the dressing operation a circuit to the motor which drives the feed screw 55 is established to turn the feed screw in a direction that will move the actuating slide forwardly. Because of the greater friction between the actuating slide and the approach slide than between the approach slide and the dresser base, the approach and actuating slides will move as a unit until the actuating slide reaches its forward limit of travel. At this point the several diamonds are each disposed on the plane to which the grinding wheel surfaces are to be dressed. Continued movement of the actuating slide (which movement is relative to the approach slide) will swing each of the dresser assemblies 62, 63, 66 in a direction that will carry the diamonds across the corresponding surfaces of the grinding wheel to dress the wheel. The end of this movement of the diamonds relative to the wheel is illustrated in Fig. 12.

When the dressing operation is complete, the driving motor is reversed to retract the actuating slide. Again, because of the frictional differences imposed by the bearing surfaces of the actuating slide and approach slide, the two slides will be retracted as a unit, thereby initially imparting to the dressing tools a straight line retracting movement away from the grinding wheel. When the approach slide reaches its rear limit of movement, the continued travel of the actuating slide will swing the tools to their initial positions. It will be evident, therefore, that a single driving means, having individually adjustable connections with each of the dressing tools, moves the tools through all of their movements relative to the dressing tool.

The reversal of the motor for driving the feed screw may be automatic. Thus, as shown in Figs. 1 and 3, a switch, not shown but located in the housing 152 on the actuating slide, has a contact controlling operator 153 extending therefrom. In the path of travel of the operator 153 and on opposite sides thereof, are pins 154 and 155 adjustably carried by a bracket 156. The circuit arrangement is such that when the grinding wheel is to be dressed, a circuit to the driving motor is closed either automatically or by the operator of the machine. The circuit thus established drives the motor in a direction to move the actuating slide forwardly, which movement continues until the operator 153 strikes pin 154 to establish a reverse circuit and break a holding circuit which has maintained the circuit first established. The return or retracting movement of the actuating slide continues until the operator 153 strikes pin 155 to break the last established or reversing circuit.

It will be evident from the foregoing that a novel dressing device has been provided in which each of the dressing tools is individually adjustable to dress a grinding wheel to a required contour. The contour may be varied as desired to develop a flank on the grinding wheel which is a modification of a straight side form by the increments necessary to compensate for the material removed from the worm flanks as a result of wheel interference. Hence the wheel flanks may be readily dressed to a form which under given conditions will grind with high precision straight sided flanks on the worm.

I claim as my invention:

1. A device for dressing a grinding wheel to a contour which will produce a straight sided worm with precision having, in combination, a base, supporting means mounted on said base for adjustment about a center line adapted to be located on the center plane of the grinding wheel and in close proximity to the periphery thereof, carriage means mounted on said supporting means for adjustment toward and away from said center line, supporting means mounted on said carriage means for swinging movement, the pivotal axis thereof being located substantially to intersect said center line, means for adjusting the position of the axis of the swinging supporting means, and dressing means carried by said swinging supporting means.

2. In a device for dressing a grinding wheel for operation on a worm or the like, the combination of dressing means for a wheel flank, a support for said dressing means mounted for swinging movement to traverse said dressing means across the wheel flank, means for limiting the extent of the dressing stroke to less than a complete traverse of the wheel flank, and means for driving said dressing means through a dressing stroke including yieldable means permitting relative movement of the driving and driven parts when movement of the latter is arrested.

3. In a device for dressing grinding wheels to produce a grinding wheel contour for cutting straight sided surfaces on helical worms or the like where the relation between the grinding wheel and the work is such as to cause wheel interference, the combination of a pivotally mounted dressing device, means for adjusting the position of said dressing device for dressing movement on an arc which lies on a plane having the same angular relationship to the radial plane of the grinding wheel as does the flank surface to be dressed, and means for further adjusting the pivotal axis of movement of said dressing device independently of the first mentioned adjusting means whereby to develop a predetermined arc on said flank surface.

JOHN J. SCHANTZ.